United States Patent [19]

Landry

[11] Patent Number: 4,948,936
[45] Date of Patent: Aug. 14, 1990

[54] FLUX CORED ARC WELDING PROCESS

[75] Inventor: Milton E. Landry, New Orleans, La.

[73] Assignee: Gulf Engineering Company, Inc., Jefferson, La.

[21] Appl. No.: 250,442

[22] Filed: Sep. 28, 1988

[51] Int. Cl.⁵ .............................................. B23K 9/04
[52] U.S. Cl. ............................. 219/76.14; 219/125.11
[58] Field of Search ............ 219/76.14, 125.11, 137 R

[56] References Cited

U.S. PATENT DOCUMENTS

| | | | |
|---|---|---|---|
| 2,813,190 | 11/1957 | Felmley, Jr. | 219/76 |
| 2,909,649 | 10/1959 | Landis et al. | 219/76.14 |
| 3,075,067 | 1/1963 | Axhelm | 219/76 |
| 3,611,541 | 10/1971 | Garrett | 219/76.14 |
| 4,322,596 | 3/1982 | Krakow et al. | 219/73.21 |
| 4,404,450 | 9/1983 | Weldon | 219/76.12 |
| 4,782,206 | 11/1988 | Ayres et al. | 219/76.14 |

OTHER PUBLICATIONS

Owner's Manual by Miller Electric Mfg. Co., Mar. 1987.
Survey of Joining and Cutting Processes, pp. 5–11.
The Welding Handbook by American Welding Society, 1987, pp. 4.1-17 to 4.1-20, 5.4-1 to 5.4-2, & 6.3-2 to 6.3-12.

Primary Examiner—Clifford C. Shaw
Attorney, Agent, or Firm—John W. Carpenter

[57] ABSTRACT

A flux cored arc welding process for depositing a weld metal onto a revolving cylindrical workpiece. A weld deposit zone is moved along a longitudinal axis of the revolving cylindrical workpiece at a relative feed velocity of 1/32 to 2 inches per each revolution of the cylindrical workpiece, per each 0.1 foot to 2 feet per minute circumferential rate of revolution of the cylindrical workpiece. The weld deposit zone deposits a weld metal onto the revolving cylindrical workpiece in a spiral or helical fashion or manner.

44 Claims, 5 Drawing Sheets

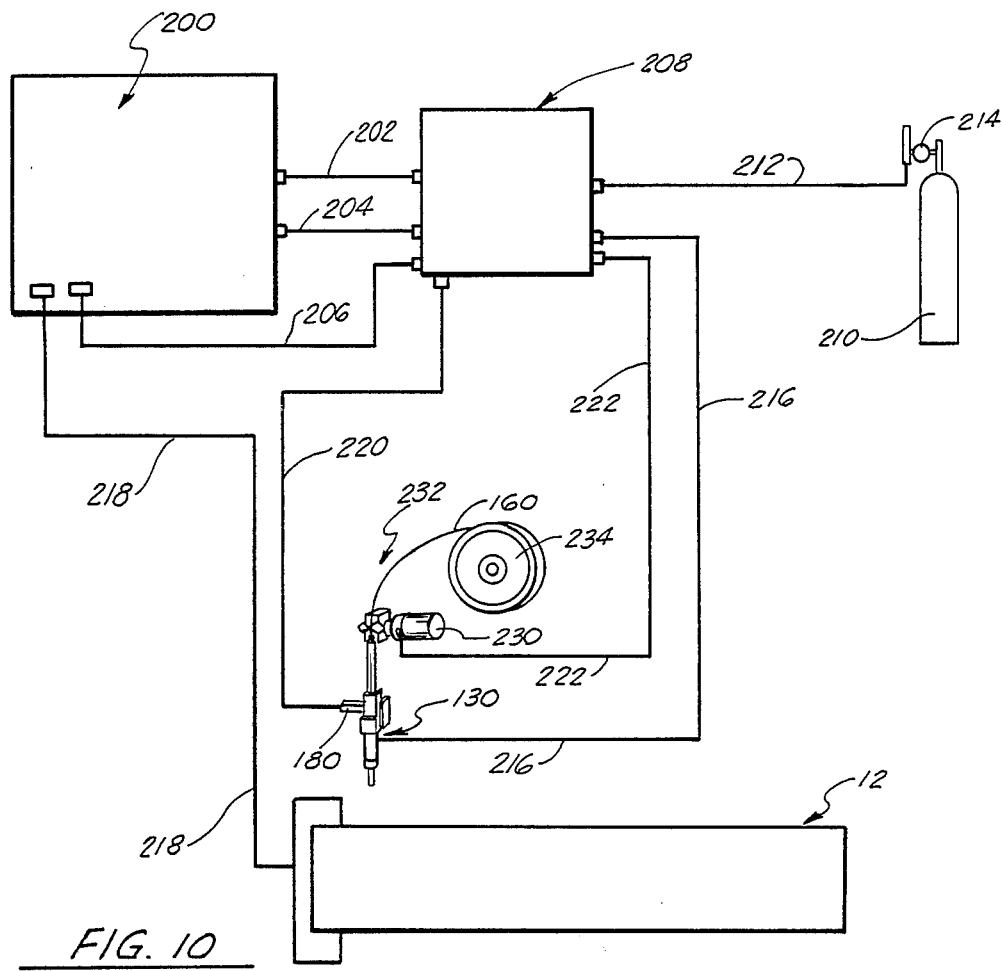
FIG. 10
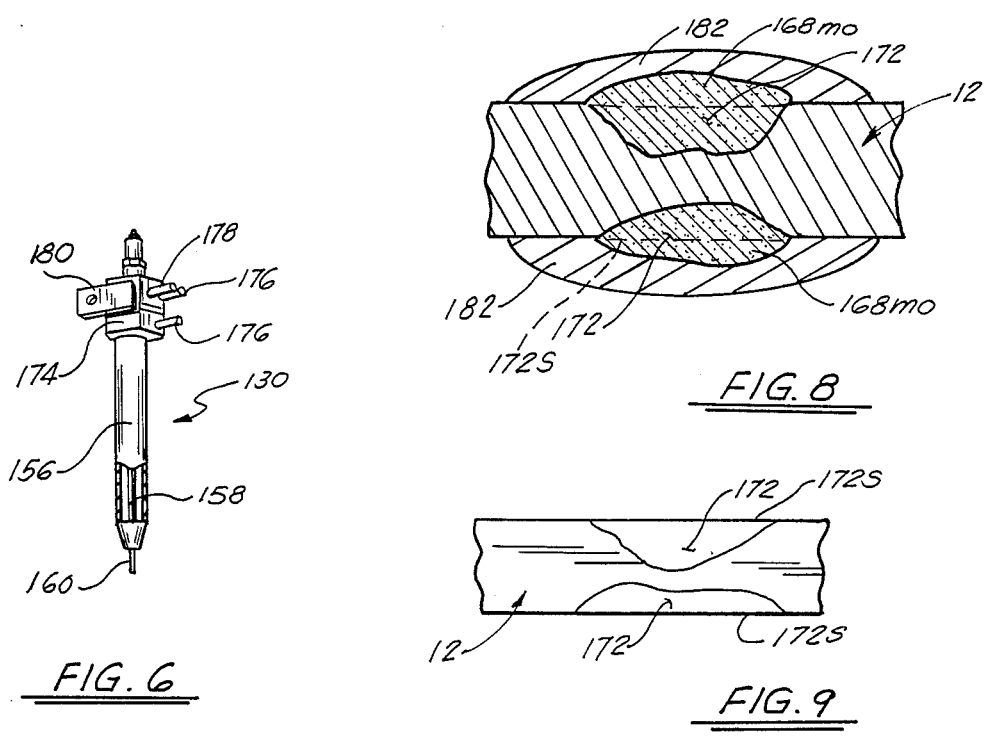
FIG. 6
FIG. 8
FIG. 9

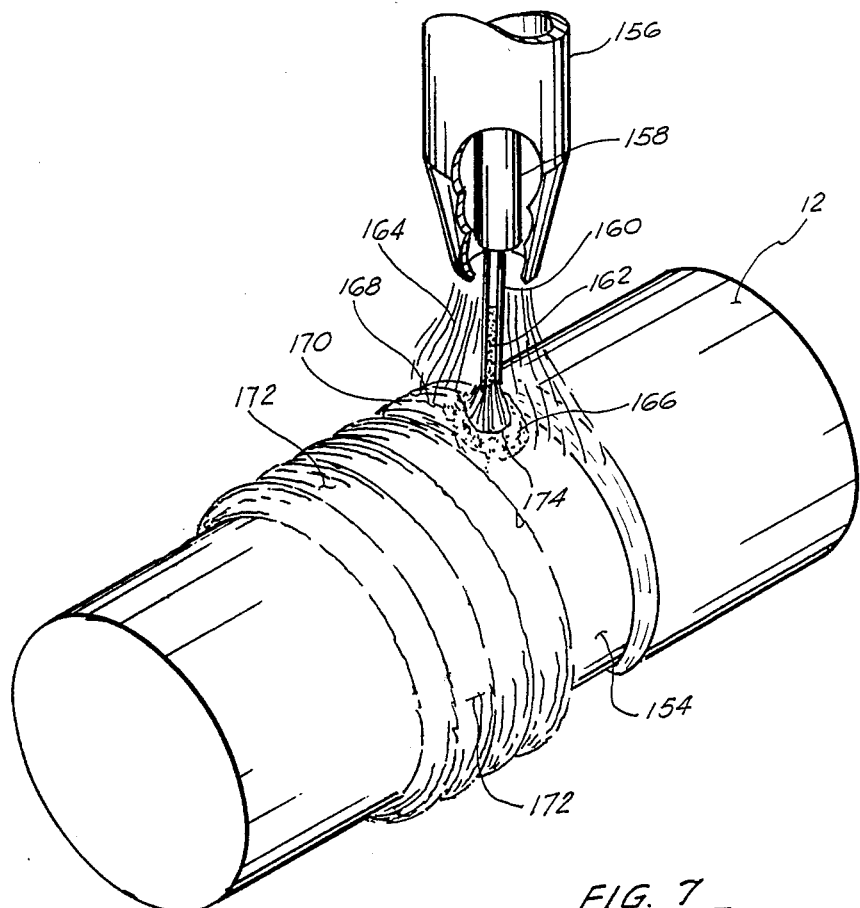
FIG. 7
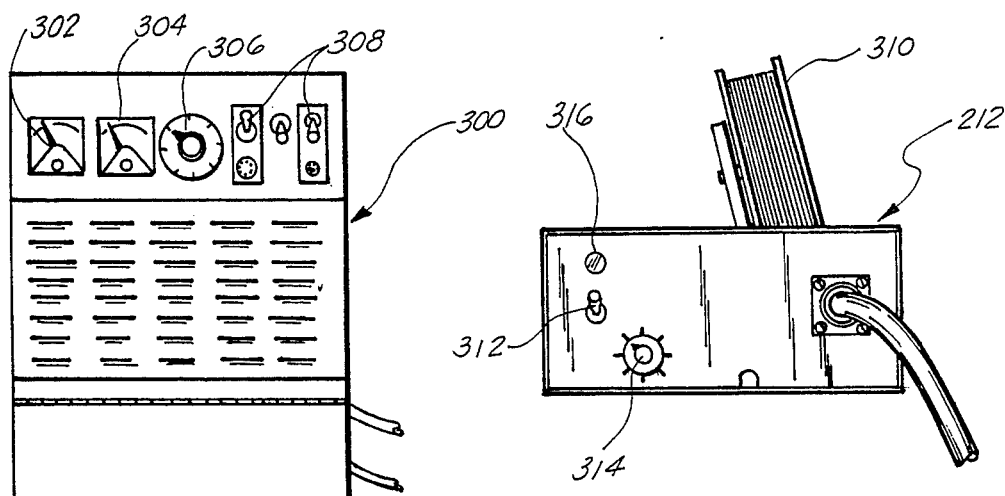
FIG. 11
FIG. 12

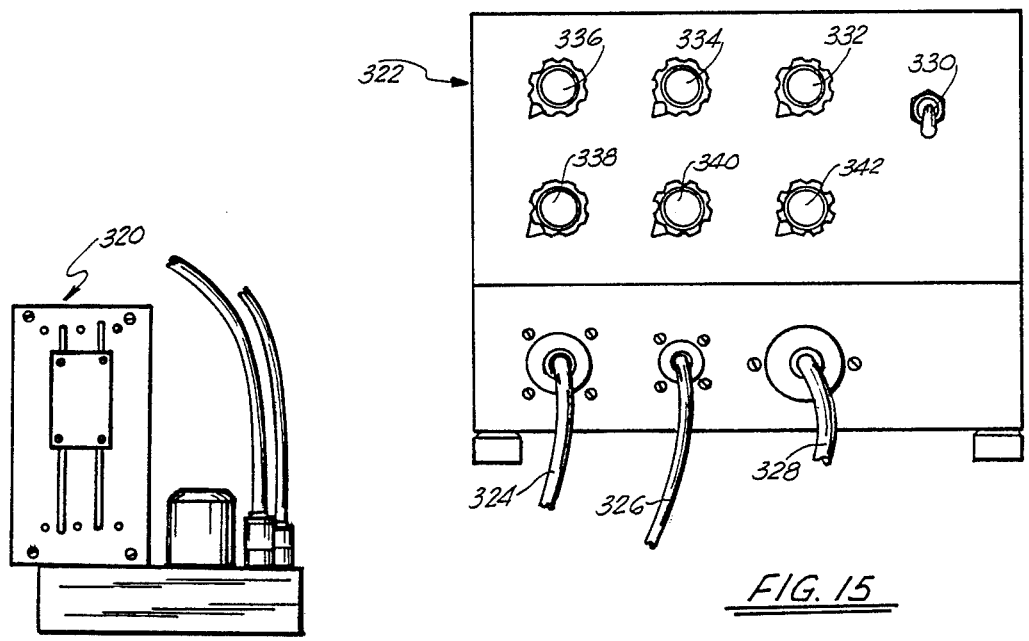
FIG. 15
FIG. 14
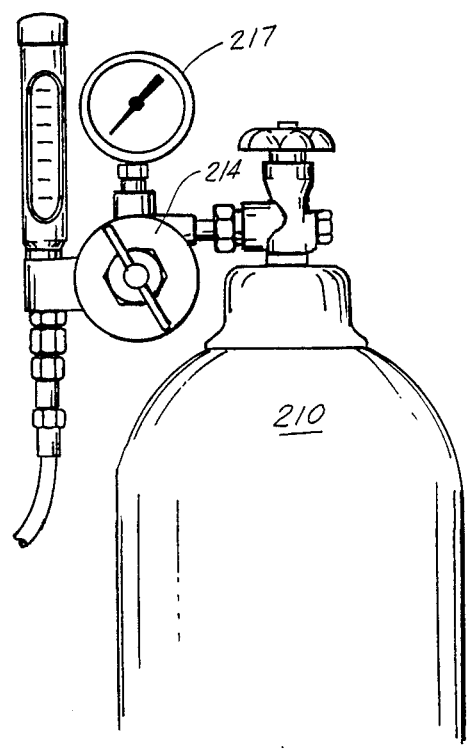
FIG. 13

FLUX CORED ARC WELDING PROCESS

1. FIELD OF THE INVENTION

This invention is related to a flux cored arc welding process. More specifically, this invention provides for a flux cored arc welding process for depositing a weld metal onto a revolving cylindrical solid worpiece.

2. DESCRIPTION OF THE PRIOR ART

It has been recognized that in operating machinery, there is a need to reduce maintenance cost and to minimize plant down times. Equipment shafts are employed in numerous machinery operations; and when such shafts become damaged or worn they have to be replaced or repaired. If the defectiveness in the shafts is not immediately remedied, the machinery employing the defective shaft remains idle, thus jeopardizing the continual operation of the entire plant employing the machinery. Depending on the extent of damage and the alloy composition of the shafts, certain damaged and worn rotating equipment shafts can be repaired by welding.

There are various conventional welding procedures that have been employed to deposit a weld metal into a base parent metal. One welding process is a manually operated procedure known as shielded metal arc welding (SMAW) process. The only requirement for this manual process is a power source (i.e., a.c. or d.c.), welding leads (cables), an electrode holder, and protective clothing and a welding helmet for the operator. The SMAW process is suitable for joining metals in a wide range of thicknesses, and is frequently used for welding components which cannot be repositioned for flat or horizontal welding. SMAW is not suitable for repairing solid, cylindrical machinery shafts due to the lack of continuity and consistency. Other more productive arc welding processes are replacing SMAW in many applications.

One welding procedure that is replacing SMAW and is used in both mechanized and semi-automatic operations is known as submerged arc welding (SAW). In SAW, the arc and molten metal are shielded by an envelope of molten flux and a layer of unfused granular flux particles. When the arc is struck, the tip of the continuously fed electrode is submerged in the flux and the arc is therefore not visible. The weld is made without the intense radiation that characterizes an open arc process and with little fumes. Many types of joints can be welded using the SAW process. Deep joint penetration can be achieved with direct current electrode positive (dcep). Therefore, edge preparation is not required in many applications. Joints may be backed with copper bars, flux, various types of tape, or integral steel members to support the molten weld metal. High welding currents can be employed to produce high metal deposition rates at substantial cost savings. The SAW process is most widely employed for welding all grades of carbon, low alloy, and alloy steels. Stainless steel and some nickel alloys are also effectively welded or used as surfacing filler metals with the process. Various filler metal-flux combinations may be selected to provide specific weld metal properties for the intended service. The flux may contain ingredients that when melted react to contribute alloying additions to the weld metal. Approximately one pound of flux is consumed for every pound of electrode used. Welds with the SAW process can only be made in the flat and horizontal positions. Circumferential welds are extremely difficult with the SAW process since the pool of molten flux and weld metal tends to spill off the cylindrical workpiece, thus producing distorted weld leads. This problem is extremely sensitive in cylindrical workpieces having a diameter smaller than thirty-six inches. Furthermore, there is no means of standardizing the SAW process since the weld head can not be positioned at an identical location with each application of the process and the arc means, being submerged, can not be seen.

Another welding process that has been frequently used is the gas tungsten arc welding (GTAW) process. The GTAW process uses a nonconsumable tungsten electrode which must be shielded with an inert gas. The arc is initiated between the tip of the electrode and work to melt the metal being welded, as well as the filler metal, when used. A gas shield protects the electrode and the molten weld pool, and provides the required arc characteristics. The GTAW process is deficient, especially for circumferentially welding and cylindrical workpieces, because the deposit rate of molten weld metal is slow, and the use of only one shielding gas allows for easier contamination of the weld zone.

The best welding processes, especially for circumferentially welding certain cylindrical workpieces where high weld integrity is required, are the gas metal arc welding (GMAW) and the flux cored arc welding (FCAW) processes. GMAW and FCAW are two distinct processes, but they have many similarities in application and equipment. Both processes use a continuous solid wire or tubular electrode to provide filler metal, and both use gas to shield the arc and weld metal. In GMAW, the electrode is solid, and all of the shielding gas is supplied by an external source. With FCAW, the electrode is tubular and contains core ingredients that may supply some or all of the shielding as needed. The FCAW process may also use auxiliary gas shielding, depending on the type of electrode employed, the material being welded, and the nature of the welding involved. The shielding gases used by both processes have a dual purpose of protecting the arc and weld zones from air and providing desired arc characteristics. A variety of gases is used depending on the reactivity of the metal and the design of the joint to be welded. A variety of welding power sources is used with the two processes.

While conventional GMAW and FCAW processes have been suitable for circumferentially welding certain cylindrical workpieces, these processes have not been suitable for circumferentially welding all cylindrical workpieces, such as those containing AISI 4100 and AISI 4300 series alloy steel. Presently, AISI 4100 series and AISI 4300 series steel cylindrical shafts which are suitable for high speed rotating equipment have to be replaced upon becoming worn or damaged. AISI 4100 series and AISI 4300 series steel shafts typically comprise high carbon and chromium-molybdenum alloy steels and have poor weldability because they are susceptible to weld cracking. Thus, what is needed and what has been invented is a welding process for repairing AISI 4100 and AISI 4300 series steel cylindrical workpieces, such as shafts.

A patentability investigation was conducted and the following U.S. patents were discovered: U.S. Pat. No. 2,813,190 to Felmley, Jr.; U.S. Pat. No. 3,025,067 to Axhelm; U.S. Pat. No. 4,322,596 to Krakow et al.; and U.S. Pat. No. 4,404,450 to Weldon. None of the foregoing prior art patents teach or suggest the particular circumferential welding process of this invention.

SUMMARY OF THE INVENTION

The present invention accomplishes its desired objects by broadly providing a flux cored arc welding process for depositing a weld metal onto a revolving cylindrical workpiece having a longitudinal axis comprising the steps of:

(a) providing a cylindrical workpiece with a circumferential surface, a longitudinal axis and containing an AISI 4100 series steel alloy or an AISI 4300 series steel alloy, and the cylindrical workpiece having a damaged area;

(b) removing the damaged area from the cylindrical workpiece to form an undercut having a depth greater than about 0.0600 inch from the circumferential surface;

(c) revolving the cylindrical workpiece at a circumferential rate of revolution of about 0.1 to 2.0 foot/min. (preferably about 0.8 to 1.2 foot/min., more preferably about 0.9 to 1.1 foot/min., most preferably about 1.0 foot/min.);

(d) moving, per each about 0.1 to 2.0 foot/min. circumferential rate of revolution of the cylindrical workpiece, a gas-shielded flux cored deposit zone along the longitudinal axis of the revolving cylindrical workpiece at a relative feed velocity of about 1/32 to 2 inches per revolution (preferably about 1/16 to 5/16 inch per revolution, more preferably about ⅛ to ¼ inch per revolution, most preferably about 3/16 inch per revolution) of the revolving cylindrical workpiece, wherein the gas-shielded flux cored deposit zone is simultaneously depositing a weld metal in a spiral fashion into the undercut while moving simultaneously along the longitudinal axis of the cylindrical workpiece;

(e) terminating the depositing of the weld metal into the undercut after the undercut has been filled with the weld metal;

(f) wrapping the weld metal-filled undercut with a non-heat sensitive material means without having post weld heat treated the weld metal-filled undercut in order to insulate the weld metal-filled undercut from ambient atmosphere and to slowly cool the weld metal-filled undercut; and (g) revolving the cylindrical workpiece while the non-heat sensitive material means surrounds the weld metal-filled undercut.

It is therefore an object of the present invention to provide a flux cored arc welding process.

This object, together with the various ancillary objects and features which will become apparent to those skilled in the art as the following description proceeds, are attained by this novel process, a preferred embodiment being shown with reference to the accompanying drawings, by way of example only, wherein:

BRIEF DESCRIPTION OF THE DRAWINGS

FIG. 6 is a perspective view of a typical nozzle of the weld head that may be employed for full-automatic welding with gas-shielded flux-cored electrode;

FIG. 7 is a partial exploded perspective view of the weld head of FIG. 5 performing gas shielded flux cored arc welding in an undercut of a cylindrical workpiece;

FIG. 8 is a partial vertical sectional view of a workpiece whose undercut has been recently welded with a weld metal and wrapped with a non-heat sensitive material for slowly cooling the workpiece;

FIG. 9 is a partial side elevational view of the workpiece of FIG. 8 after weld metal overage has been removed from the deposited weld metal in order for the exposed weld metal surfaces to register or align with the cylindrical surface of the workpiece;

FIG. 10 is a schematic view of a full-automatic welding facility that is capable of conducting the flux cored arc welding method of this invention;

FIG. 11 is a front elevational view of a welding control panel;

FIG. 12 is a front elevational view of a front of a wire feeder control box and motor which feeds and controls the flow of wire to and through the weld head;

FIG. 13 is a partial side elevational view of a tank containing a shielding gas source;

FIG. 14 is a front elevational view of the oscillatory stepper motor head unit; and FIG. 15 is a front elevational view of a control panel for the oscillatory stepper motor.

DETAILED DESCRIPTION OF THE INVENTION

Figure 1:
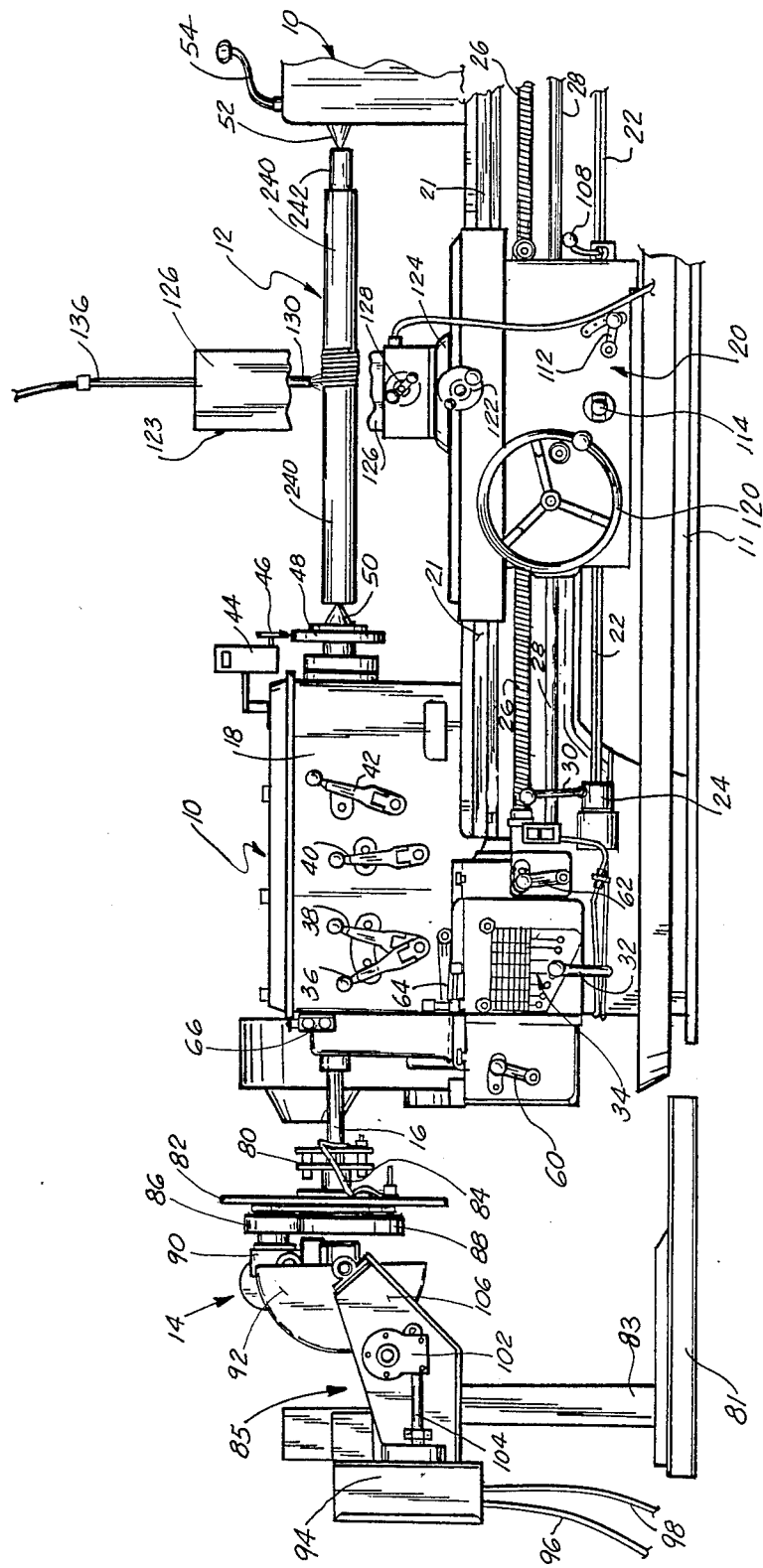
FIG. 1 is a side elevational view of a conventional engine lathe that has a common shaft coupled to a gear reduction means for performing or conducting the method of this invention.

Referring in detail now to the drawings, wherein similar parts of the apparatuses in the drawings are identified by like reference numerals, there is seen a conventional prior art engine lathe means, generally illustrated as 10, which is capable of engaging and rotating a cylindrical workpiece, generally illustrated as 12, at less than 5 r.p.m., preferably 0.25 to 0.75 r.p.m., more preferably about 0.5 r.p.m. The engine lathe 10 has a base 11 and may be any suitable standard engine lathe that is capable of machining round pieces at a revolving rate of 0.05 to 5 r.p.m. The engine lathe 10 shown in the drawings for conducting the method or process of this invention comprises a gear reduction means, generally illustrated as 14, coupled to a common shaft 16 passing rotatably into an engine housing 18 of the engine lathe 10. Without the gear reduction means 14, the engine lathe 10 shown in the drawings would rotate the cylindrical workpiece above 10 r.p.m. Thus, since in a preferred embodiment of the invention the cylindrical workpiece 12 is to revolve at a rate of 0.05 to 5 r.p.m., the gear reduction means 14 is required to reduce the output rate of rotation of the engine lathe 10.

As best illustrated in FIG. 1, the engine lathe 10 comprises a lathe carriage, generally illustrated as 20, that is capable of being moved horizontally along a lathe ridge 21 by a polygonal drive shaft 22 coupled to an engine (not shown in the drawings) housed in the engine housing 18. A clutch 24 couples the polygonal drive shaft 22 to the engine to cause the drive shaft 22 to rotate and move the lathe carriage 20 horizontally along a threaded support shaft 26 and a circular support shaft 28. Clutch 24 has a clutch handle 30 for engaging and disengaging the clutch 24 to the polygonal drive shaft 22.

The rate, speed or velocity of horizontal movement of the lathe carriage 20 can be set by registering or pivoting lever 32 with or to the appropriate rate indicia 34 that has been secured or labeled on the engine housing 18. Indicia 34 is horizontal travel rate settings in inches per each revolution of the cylindrical workpiece 12. Preferably the lever 32 is set or registered with the appropriate settings of the indicia 34 such that the lathe carriage 20 moves along the longitudinal axis of the revolving workpiece 12 at a relative velocity of from about 1/32 inch per each revolution of the cylindrical workpiece 12 to about 2 inches per each revolution of the cylindrical workpiece 12. As will be discussed in greater detail below, such relative velocity of the lathe carriage 20 is per each 0.1 foot/min. to about 2 feet/min. circumferential rate of revolution of the cylindrical workpiece 12. In a preferred embodiment of the invention, the relative velocity of the lathe carriage 20 along the longitudinal axis of the revolving workpiece 12 is 1/16 inch to 5/16 inch per revolution of the cylindrical workpiece 12, per 0.8 foot/min. to 1.2 foot/min. circumferential rate of revolution of the cylindrical workpiece 12.

The engine lathe 10 further includes levers 60, 62 and 64 for horizontal travel rate adjustments, and levers 36, 38, 40 and 42 for assisting in setting the circumferential rate of revolution for the cylindrical workpiece 12 as will be more particularly explained below. Push button switch means 66 is for turning the engine lathe 10 "on" or "off".

The gear reduction means 14 comprises a flange coupling 80 for coupling the common shaft 16 to a fly wheel means 82. Electrical cable 84 is interconnected between the fly wheel means 82 and the common shaft 16 for grounding the latter. The gear reduction means 14 has a base 81, and a stanchion 83 secured to the base 81 for supporting the power means, generally illustrated as 85, of the gear reduction means 14. The power means 85 of the gear reduction means 14 comprises a head stock driver gear 86, a pinion gear 88, a right angle gear box 90 for driving head stock, a positioner head gear wheel 92, and a power panel 94. Cable 96 is a power cable and cable 98 is a control panel cable. The power means 85 also includes positioner head gear box 102, positioner adjustment shaft 104 and bracket 106.

Figure 2:
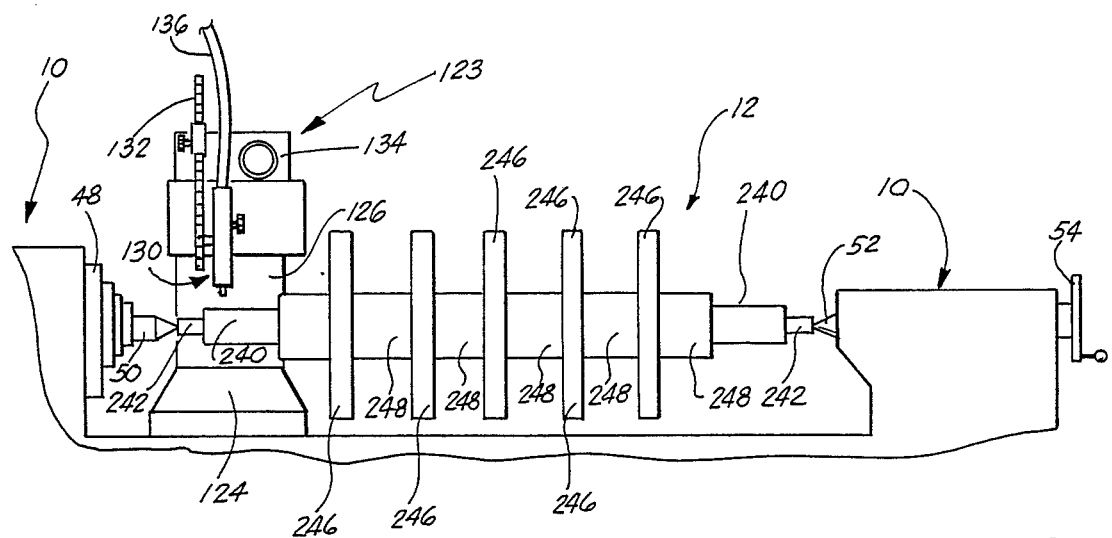
FIG. 2 is a partial side elevational view of another engine lathe engaging a cylindrical workpiece supporting impellers in a stacked position.

The circumferential rate of reduction of the cylindrical workpiece 12 can be adjusted by the gear reduction means 14 in combination with the levers 36, 38, 40 and 42, both of which set gears of a gear box (not shown in the drawings) within lathe housing 18 such that the cylindrical workpiece 12 will have the preferred circumferential rate of revolution of 0.1 foot/min. to 2 feet/min. In FIG. 1 tachometer 44 (or speed indicator), having a tachometer wheel 46 rotatably contacting a chuck 48, is mounted on top of the lathe housing 18 to display the circumferential rate of revolution of the chuck 48 which is coupled to the common shaft 16. Secured to the chuck 48 in both FIGS. 1 and 2 is a fixed head stock 50 for firmly engaging the cylindrical workpiece 12. The engine lathe 10 additionally includes an adjustable tail stock 52 which can be finely adjusted horizontally by a handle 54. The cylindrical workpiece 12 is fixedly compressed by the fixed head stock 50 and the adjustable tail stock 52 such that the rotary rate of the chuck 48 is imparted to the cylindrical workpiece 12. Thus, if the rate of revolution of the chuck 48 is 0.1 foot/min., then the rate of revolution of the cylindrical workpiece 12 is also 0.1 foot/min. Similarly, if the rate of revolution of the chuck 48 is 2 feet/min., then the rate of revolution of the cylindrical workpiece 12 is also 2 feet/min. As was previously indicated, a preferred circumferential rate of revolution of the cylindrical workpiece is from about 0.8 foot/min. to about 1.2 foot/min. At a particular rotary rate between 0.8 to 1.2 foot/min., any particular point on the chuck 48 or the cylindrical workpiece 12 is revolving at a particular circumferential speed or rate between 0.8 to 1.2 foot/min. More specifically, with a 1.0 foot/min. rotary rate, any particular circumferential point on the chuck 48 has a circumferential velocity, speed or rate of 1.0 foot/min., and any particular circumferential point on the cylindrical workpiece 12 also has a circumferential velocity, speed or rate of 1.0 foot/min.

The lathe carriage 20 has a lever 108 for carriage adjustment, and a lever 112 for carriage traverse direction. When knob 112 is in the bottom position, the carriage 20 moves right. When knob 112 is in the middle position, carriage 20 is in neutral; and when knob 112 is at the top, the carriage 20 moves left. The lathe carriage 20 additionally includes a carrier clutch knob 114. A wheel handle 120 is rotatably disposed on the lathe carriage 20 for manual horizontal adjustment of carriage 20. A crank handle 122 is provided for fine adjustment of horizontal carriage. Mounted on the lathe carriage 20 is a weld head support means, generally illustrated as 123.

The weld head support means 123 has a base 124 integral with the lathe carriage 20 and a back 126 secured to the base 124 for supporting a weld deposit zone, which as illustrated in FIG. 2, includes a weld head 130 secured to a height adjuster 132 which is connected to or supported by the back 126. A crank handle 128 rotatably passes through the base 124 for fine diametrical head adjustment. As is further illustrated in FIG. 2, an oscillating stepper motor controller 134 disposed on the back 126 and functions to weave application of weld metal on workpiece 12. A conduit 136 extends to the weld head 130 and carries or includes other conduits which carry or conduct shield gas, wire feed lines, and cooling fluid (e.g. water, antifreeze, etc.).

The weld head 130 provides a weld deposit zone which has a horizontal rate or velocity of travel along the axis of the cylindrical workpiece 12 that is the same as the lathe carriage 20; more specifically, 1/32 inch to 2 inches, per revolution of the cylindrical workpiece 12, more preferably, 1/16 inch to 5/16 inch, per each revolution of the cylindrical workpiece 12. In a preferred embodiment of the invention, the weld deposit zone (or weld head 130) is the flux cored arc welding (FCAW) type which uses cored electrode wire instead of solid electrode wire for joining ferrous metals. The flux core may contain minerals, ferroalloys, and materials that provide shielding gases, deoxidizers, and slag forming materials. The additions to the core promote arc stability, enhance weld metal mechanical properties, and improve weld contour. The cored electrode wire employed in FCAW of this invention is designed to be used with additional external shielding.

Figure 3:
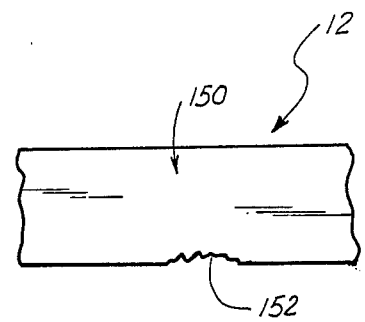
FIG. 3 is a partial side elevational view of a cylindrical workpiece having a crack and a groove.
Figure 4:
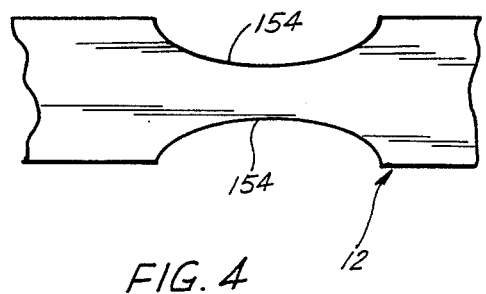
FIG. 4 is a side elevational view of the workpiece of FIG. 3 having the groove and crack removed or undercut therefrom.
Figure 5:
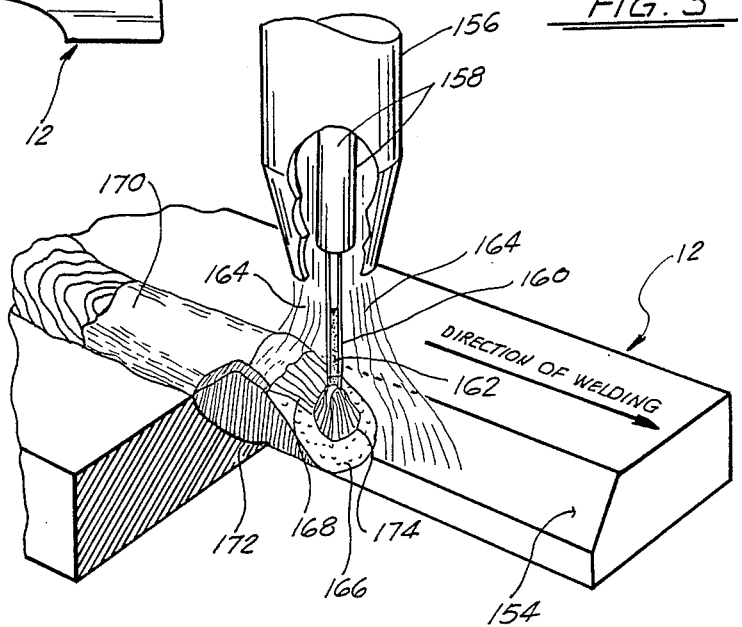
FIG. 5 is a partial perspective view of a weld head performing a gas shield flux cored arc welding process.

Referring in detail now to FIGS. 3-9 for a more detailed discussion of the preferred weld deposit zone (or weld head 130) employing shielding gas, and electrodes, and circulating water for cooling, a cylindrical workpiece 12 (see FIG. 3) is provided which is cracked on the circumference at 150 and/or grooved, gouged (or otherwise damaged) at 152. The damaged cylindrical workpiece 12 of FIG. 3 is initially prepared by undercutting (or removing) out the cracked 150 and/or gouged 152 zones to obtain a cylindrical workpiece 12 with an undercut (or circumferential channel) 154 as illustrated in FIG. 4. The undercut 154 or work zone to receive the weld metal or weld build-up may be any desired length, such as ⅛ inch to 30 feet, and any suitable depth, such as 1/20,000 inch to 1 foot, depending on the diameter of the workpiece 12. The welding process of this invention is particularly suited for depositing a weld metal into an undercut 154 having a depth of greater than about 1/20,000 inch from the circumferential surface of the cylindrical workpiece 12, more preferably having a depth of from about 0.06 inch to about 1 inch. The undercut 154 preferably traverses the entire circumference of the workpiece 12. The cylindrical workpiece 12 is disposed in a horizontal posture (as illustrated in FIG. 1) by stationarily engaging the ends of the cylindrical workpiece 12 with the fixed head stock 50 and the adjustable tail stock 52. The undercut 154 (including the zones for the workpiece 12 two to eight inches on each side of the undercut 154) is preferably preheated by any suitable means, such as electrically or by flame heating, to an elevated temperature, say 150° F. to 800° F. with about 400° F. to 600° F. being preferred, and subsequently allowed to soak or remain at the preheated temperature for a suitable period of time, for example 5 to 25 minutes. The weld head 130 is subsequently disposed over the preheated undercut 154 and the welding parameters (which will be discussed in greater detail below) are activated, turned on, or otherwise implemented to commence the gas shielded flux cored arc welding which employs a gas nozzle 156, a wire guide and contact tube 158 concentrically disposed into and along the gas nozzle 156, and a fluxed cored electrode wire 160. Shielding gas 164 flows through the gas nozzle 156 and around the contact tube 158 and the fluxed cored electrode wire 160 in order to protect molten weld metal 166 and trailing metal 168 (or dried up shredding mixture) from contamination by the oxygen and nitrogen in ambient air. As illustrated in FIG. 5, the metal 168 hardens after cooling into a solidified slag 170 and subsequently into a weld metal 172. Arc and metal transfer occurs at 174. As illustrated in FIG. 6, the gas nozzle 156 has a nozzle head 174 with circulating water conduits 176–176 extending therein along with a shielding gas conduit 178. Cooling fluid passes through conduits 176–176, whereas shielding gas is pressurized through shielding gas conduit 178. Power leads 180 are attached to the nozzle head 174 for conducting current from a power source through the contact tube 158 at the axis of the nozzle 156 to transfer welding current to the electrode 160. As was previously indicated, while the weld head 130 is depositing the metal 168 (which eventually hardens into the weld metal 172), it is moving axially, per each 0.1 foot/min. to 2 feet/min. circumferential rate of the cylindrical workpiece 12, along the horizontal axis of the cylindrical workpiece 12 at a relative feed of from about 1/32 inch to 2 inches, per revolution of the cylindrical workpiece 12. At such preferred relative rates, the weld head 130 is depositing the metal 168 into the undercut 154 in a spiral or helical fashion, as best shown in FIG. 7. After all of the required metal 168 has been deposited into the work zone (or undercut 154), there is typically a weld metal overage 168 mo, and the metal 168 (including weld metal overage 168 mo) is subsequently preferably entirely wrapped (as illustrated in FIG. 8) with a non-heat sensitive material means (an insulator) 182, which allows slow cooling preferably while continuing to rotate the cylindrical workpiece 12, such as at the preferred circumferential rate of 0.1 foot/min. to 2 feet/min. Thus, in a preferred embodiment of the present invention, there is no post weld heat treat (PWHT), such as with 400° F. to 600° F. PWHT for 5 to 30 mins., of the metal 168. As will be further shown in the examples below, best welding results are obtained with the welding process of this invention by no PWHT of the metal 168 (or the solidified slag 170 or the weld metal 172). Best results are obtained by wrapping the weld area (after knocking off all slag before wrapping) with the non-heat sensitive material means (or insulator) 182, which allows for slow cooling instead of cooling under ambient conditions. This form of slow cooling is preferably accompanied by continually rotating or revolving the cylindrical workpiece 12 at a suitable rate, such as a circumferential rate from about 0.1 foot/min. to about 2 feet/min. until the weld metal 172 has reached ambient temperature, which typically takes 1 to 8 hours. After the workpiece 12 (including the solidified slag 170) has been slow cooled accordingly, the insulation wrapping 182 is removed and any weld metal overage 168 mo may be removed, such as by grinding (or otherwise machining), such that a circumferential surface 172S of the weld metal 172 collimates with the remaining circumferential surface of the cylindrical workpiece 12 as illustrated in FIG. 9. After grinding the weld metal 172 to circumferential surface 172S to remove overage, preferably surface 172S should be buffed in order to prepare the repaired cylindrical workpiece for its previous use.

Referring now to FIG. 10 wherein a schematic and individual elements for a conventional full-automatic welding facility that is capable of conducting the flux cored arc welding method of this invention are illustrated. A d.c. or a.c. power source, generally illustrated as 200, is electrically engaged via conductors 202, 204, and 206 to a control panel means, generally illustrated as 208 in FIG. 10. A shielding gas source 210 is provided to supply or conduct shielding gas through a conductor 212 to a solenoid valve (not shown) within the control panel means 208. The shielding gas source 210 is also provided with a flow-control valve 214 and indicator 217, all of which are for controlling and metering the flow rates of the shielding gas, which is preferably 20 to 50 cubic feet per hour. The shielding gas is conducted from the solenoid valve within control panel means 208 through a conductor 216 that leads to the shielding gas conduit 178 on the nozzle head 174 of the weld head 130. A ground wire 218 extends from the power source 200 to the cylindrical workpiece 12. An electrode power cable 220 extends from the control panel means 208 to the power lead 180 of the weld head 130. Power lead 180 is in electrical contact with the contact tube 158 at the axis of the nozzle 156 in order to transfer welding current to the electrode wire 160. Conduit 222 interconnects the control panel means 208 with an electrode wire drive motor 230 of a power feed means, generally illustrated as 232, which drives the electrode wire 160 at a preset and uniform rate. The power feed means 232 includes a mount 234 for electrode wire 160 in a coiled or spooled position. The control panel means 208 contains the necessary relays, solenoids, and timers needed to integrate the system.

Furthermore, the control panel means 208 additionally includes the necessary controls to initiate and stop the wire drive motor 230 from driving the electrode wire 160 as well as the necessary controls (such as a solenoid valve) to initiate and stop the flow of shielding gas from the shielding gas source 210, and the flow of electric current from the power source 200 to the arc and metal transfer 174 (see FIG. 5). If used, cooling water flowing to the circulating water conduits 176-176 can also be controlled from the control panel means 208. FIG. 10 does not illustrate the flow of cooling water, but as was previously indicated, the weld head 130 in FIG. 6 is provided with the water conduits 176-176 to receive any appropriate cooling medium, such as water.

FIGS. 11-15 are individual controls for a semi-automatic welding facility. FIG. 11 is a front elevational view of a welding control panel, generally illustrated as 300, which includes a current meter 302, a voltage meter 304, a voltage adjustment knob 306, and on/off switches 308-308. FIG. 12 is a front elevational view of a wire feeder control box, generally illustrated as 212, having a motor (not seen), a mount 310 to hold electrode wires 160, an on/off switch 312, a wire feed adjustment knob 314, and a remote control means 316. As previously indicated above, the shielding gas source is indicated as 210, and includes flow-control valve 214 and indicator 217. FIG. 14 depicts an oscillatory stepper motor head unit, generally illustrated as 320, which would be employed in a semi-automatic welding facility. FIG. 15 is a stepper motor control panel, generally illustrated as 322, for the stepper motor head unit 320. The control panel 322 comprises a power chord 324, a remote cable 326, a cable 328 that expands to a panel (not shown). The control panel 322 also comprises the following control means: on/off switch 330, horizontal dwell 332, horizontal speed right 334, horizontal speed left 336, vertical speed up 338, vertical speed down 340 and vertical dwell 342.

The shielding gas of this invention is one of the welding parameters and may be any suitable shielding gas that is capable of producing the desired results of the process of this invention. As was previously mentioned, the primary purpose of the shielding gas is to protect the molten weld metal 166 from contamination by the constituents of the atmosphere, such as oxygen and nitrogen. The factors, in addition to cost, that affect the suitability of a gas include the influence of the gas on the arcing and metal-transfer characteristics during welding, weld penetration, width of fusion and surface shape, welding speed, and the tendency to undercut. Among the inert gases—helium, argon, neon, krypton, and xenon—the only ones plentiful enough for practical use in the welding process of the present invention are helium and argon. These gases provide satisfactory shielding for the more reactive metals, such as aluminum, magnesium, beryllium, columbium, tantalum, titanium, and zirconium. Although pure inert gases protect metal at any temperature from reaction with constituents of the air, they are not suitable for all welding applications. Controlled quantities of reactive gases (e.g. oxygen, nitrogen, and carbon dioxide) mixed with inert gases improve the arc action and metal-transfer characteristics when welding the steels. In a preferred embodiment for the present invention, the shielding gas comprises 70% to 80% by volume argon and 20% to 30% by volume carbon dioxide; however, other inert gases and/or reactive gases are within the spirit and scope of the present invention, such as 75% by volume argon and 25% by volume helium, 100% by volume argon, 100% by volume $CO_2$, and 75% by volume helium plus 25% by volume $CO_2$.

In addition to the shielding gas, two other welding parameters employed in the gas-shielded flux-cored process of this invention are electrical parameters and the type of electrode 160 (or wire). As was previously indicated, fluxed cored electrode wire 160 is to be used with the shielding gas, as opposed to the self-shielded flux-cored type of electrodes. The chemical composition or ingredients in the core of the electrode wire 160 are for fluxing, deoxidizing, scavenging, and sometimes alloying additions, rather than for these functions plus the generation of protective vapors. The chemical composition or ingredients of the filler weld metal (i.e., the electrode wire 160) is preferably matched as closely as possible to that of the cylindrical workpiece 12. The electrode wire 160 may be any electrode wire 160 that is capable of producing the welding results of the process of this invention. Preferred electrode wires 160 are sold under the tradenames of Hobart and Chemtron.

Electrical parameters include current (amps), voltage, and speed of tubular electrode wire feed from the power feed means 232. The amount of current and voltage that is to emanate from the power source 200 is directly proportional to the diameter of the tubular electrode wire 160. By way of example only, an electrode wire 160 with a diameter of 5/64 inch would require 200-600 amps and 25 to 35 volts, and a ⅛ inch diameter electrode wire 160 would require 300-900 amps and 35 to 50 volts. The welding current determines the rate at which the electrode wire 160 is melted. An increase in current increases melt-off rate, but an excessively high current produces lots of heat and an erratic arc. Too low voltage produces a narrow bead that does not readily bridge gaps. Excessively high voltage produces a concave fillet weld that is subject to cracking, and in multiple-pass welds, increases the alloy content thereby producing a crack-sensitive weld. As indicated, wire or electrode feed is proportional to the current being conducted through the contact tube 158 at the axis of the nozzle 156 to transfer welding current to the electrode 160. If the feed is too slow or too fast, the molten weld metal 166 will not form properly within the undercut 154. While any suitable amps, voltage and tubular electrode wire feed are within the spirit and scope of the invention as long as the unexpected welding results for the method of this invention are produced, the welding amps (i.e., d.c. reverse polarity as opposed to straight polarity) are from 50 to 200 amps, say 80 to 130 amps (more preferably 100 to 120 amps), for a 1/32 to ⅛ inch (more preferably 1/16 to 3/32 inch) in diameter electrode 158; and the welding voltage is from 20 to 30 volts, say 22 to 27 volts, with a more preferred voltage being 24 to 26 volts. The wire feed at the preferred amperage is 100 to 500 i.p.m. (inches per minute) with 180 to 400 i.p.m. being more preferred.

The electrode wire 160 position in the flux cored arc welding process for this invention is top dead center, or 12 o'clock on the workpiece 12. The size of the molten pool can be controlled by limiting bead size which, in turn, depends on the amperage and travel speed. Lowering the current and increasing travel speed reduce bead size. The size of the bead is limited by the diameter of the cylindrical workpiece 12. Approximate maximum sizes for single-pass welds on small-diameter cylindrical workpiece 12 vary from about 1/16 inch in depth bead for a 1½ inch diameter cylindrical workpiece 12 to a ¼ inch in depth bead for a 5 inch in diameter workpiece.

The cylindrical workpiece 12 to be repaired by the process of this invention may be any cylindrical workpiece 12 that is to be repaired via the gas-shielded flux-cored welding process in order to reclaim the Original Equipment Manufacture (OEM) specification sizes. Typically, the workpiece 12 to be repaired would be a cylindrical, solid shaft 240, generally having at least one coupling end 242 on the shaft 240 (see FIGS. 1 and 2). Coupling 242 receives or transmits the thrust when cylindrical shaft 240 is used in machinery. As was previously indicated, the shaft 240 to be repaired would have a crack 150 and/or a groove 152 (see FIG. 3), or be otherwise damaged, such as having an enlarged or oversized, worn keyway. The gas-shielded flux-cored welding process of this invention is particularly, ideally suited for those shaft(s) 240 (or cylindrical workpiece(s) 12) having an alloy steel composition having a high carbon content, such as above about 0.30% by weight. Such alloy steel compositions having a high carbon content are AISI 4000, 4100, 4300, 4400, 4500, 4600, 4700 and 4800 series steel. The AISI 4000 series of alloy steel include the following by AISI No.: 4012, 4023, 4024, 4027, 4028, 4032, 4037, 4042, 4047 and 4063. The AISI 4100 series of alloy steels comprises the following by AISI No.: 4118, 4130, 4135, 4137, 4140, 4142, 4145, 4147, and 4150. Typical AISI 4300, 4400, 4500, 4600, 4700 and 4800 series of alloy steel are as follows by AISI No.: 4320, 4337, 4340, E4340, 4422, 4427, 4520, 4615, 4620, 4621, 4640, 4718, 4815, 4817, and 4820. It has been discovered that the gas-shielded flux-cored welding process of this invention is more particularly, ideally suited for those shaft(s) 240 (or cylindrical workpiece(s) 12) containing not only a high carbon content but also chromiummolybdenum, such as AISI No. 4130 alloy steel comprising 0.28–0.33% wt. carbon, 0.40–0.60% wt. manganese, 0.80–1.10% wt. chromium, and 0.15–0.25% wt. molybdenum; and AISI No. 4140 alloy steel comprising 0.38–0.43% wt. carbon, 0.75–1.00% wt. manganese, 0.80–1.10% wt. chromium, and 0.15–0.25% wt. molybdenum; and AISI No. 4340 alloy steel comprising 0.38–0.45% wt. carbon, 0.60–0.80% wt. manganese, 1.65–2.00% wt. nickle, 0.70–0.90% wt. chromium, and 0.20–0.30% wt. molybdenum. AISI Nos. 4130, 4140, and 4340 alloy steels each typically also include about 0.04% wt. phosphorus (P), about 0.04% wt. sulfur (S), and 0.20–0.35% wt. silicon (Si). One of the salient features of the present invention is that the AISI No. 4100 and 4300 series (i.e., alloy steels containing chromium) shaft(s) 240 (or cylindrical workpieces 12) can be repaired by the process of this invention without unstacking any impellers, or the like, that are distributed therealong. FIG. 2 illustrates a shaft 240 having a plurality of impellers 246 keyed to the shaft 240 and equally spaced apart by a plurality of sleeves 248. Presently, in order to repair by welding AISI No. 4100 or 4300 series alloy steel shaft(s) having any impellers 246 (or any other shaft accessory means, such as sleeves, turbines, etc., mounted thereon), such impellers 246 or shaft accessory means have to be removed because such AISI No. 4100 or 4300 series alloy steel shaft(s) have not successfully been repaired by welding; they have to be entirely replaced with a new AISI No. 4100 or 4300 series alloy steel shaft. There is presently no known process that can repair an AISI No. 4100 series or 4300 series steel shaft to OEM specification, especially in repairing a crack 150 or groove 152 1/20,000 inch or greater in depth. Chromium plating, better known as "chrome plating", results only in 0.06 (or less) inch in thickness of plating. Thus, a groove 152 or a crack 150 (see FIG. 3) in an AISI No. 4100 or 4300 series alloy steel cylindrical workpiece 12 deeper than 0.06 inch can not be repaired by chrome plating the entire AISI No. 4100 series or SAE No. 4300 series cylindrical workpiece 12 (i.e., shaft 240 has to be replaced). Thus, any impellers 246 (or any shaft accessory means) mounted on or to the damaged AISI No. 4100 series or AISI No. 4300 series workpiece 12 (or shaft 240) need to be removed for replacement purposes. After replacement, the impellers 246 would have to be keyed to the new AISI No. 4100 series or AISI No. 4300 series workpiece 12 (or shaft 240), with a sleeve 248 between contiguous impellers 246 for spacing functions. While the maximum buildup in chrome plating is generally about 0.06 inch, more buildup can be achieved but with the following disadvantages: (1) chrome plating chips or rubs off; (2) chrome plating does not add to the integral strength of the shaft; and (3) chrome plating is very hard for probes to work on the surface since it is non-magnetic.

The invention will be illustrated by the following set-forth examples which are given by way of illustration and not by any limitation. All parameters such as rates, etc., submitted in these examples are not to be construed to unduly limit the scope of the flux cored arc welding process for depositing a weld metal onto a revolving cylindrical workpiece 12.

EXAMPLE I

A ⅛ inch deep groove in a 2½ inch in diameter shaft was repaired with the gas-shielded flux-cored method of this invention. The shaft was composed of AISI No. 4140 alloy steel. The ⅛ inch deep groove was undercut entirely around the circumference of the shaft to ⅛ inch below the bottom of the groove to form an undercut having a depth of ¼ inch. After the shaft was mounted for revolution on an engine lathe, the ¼ inch undercut of the 2½ inch D shaft was preheated at 500° for 30 minutes and allowed to soak for 15 minutes. The shaft was revolved at a circumferential rate of 0.7 to 1.3 foot/min. A gas shielded flux cored weld head was set to travel along the longitudinal axis of the workpiece 12 at a relative feed velocity of about 0.06 to 0.30 inch per revolution of the workpiece 12, per each circumferential rate of revolution of 0.7 to 1.3 foot/min., after being positioned over the undercut such that the contact tube was ¾ inch to 1 inch from the bottom of the undercut. The shielding gas(es) was 75% by volume of an inert gas and 25% by volume of a reactive gas had a flow rate of 5 to 80 cubic feet per hour. The welding current was 25 to 200 amps d.c. (reverse polarity) at 5 to 50 volts. The electrode wire was Chemtron T 4130L type (AISI No. 4130) with a diameter of 0.045 inch and a feed of 180 to 400 inches per minute. The mode of metal transfer was the globular transfer type. After the entire undercut was filled with weld metal it was post weld heat treated at 500° F. for 15 minutes. After cooling, the shaft was cross-sectioned macro through the weld metal and remaining shaft structure for a hardness survey. There were four distinct weld zones. Starting outwardly, the first zone was the 4130 flux cored weld metal; the second zone was the weld interface zone (or heat affected zone #1); the third zone was the heat affected zone #2, and the 4140 base metal shaft was the fourth zone. Primary concerns are the hardness (i.e., Rockwell C Scale Readings) readings of the weld interface zone and the heat affected zone #1. A commercially acceptable Rockwell C Scale Reading for hardness is 22 or greater. The hardness survey revealed a Rockwell C Scale Avg. Reading of 23 for the weld metal, 31 for the weld interface zone, and 22 for heat affected zone #1. Upon further evaluation of the cross section, it was determined that the microstructure of the critical zones (i.e., the weld interface zone and the heat affected zone #1) consisted primarily of upper bainite, a substance closely related to spherodized pearlite. Upper bainite has significantly higher strength and hardness and lower ductility than pearlite. There was no sign of untempered martensite which is known to be unsuitable for engineering application due to its brittleness.

EXAMPLE II

Example I was repeated with the exception that instead of post weld heat treating (PWHT) the deposited weld metal, the deposited weld metal was wrapped in or with an insulator and the shaft was continually rotated, both of which functioned to slowly cool the weld deposit instead of cooling ambiently. The hardness survey revealed a Rockwell C Scale Avg. Reading of 22 for the weld metal, 32 for the weld interface zone, and 26 for heat affected zone #1. Thus, better welding results with respect to the hardness (and microstructure) of the critical zones were produced with insulating to slowly cool the recently deposited weld metal, and with no PWHT.

EXAMPLE III

Repeat Examples I and II with an AISI No. 4130 or 4340 steel alloy shaft and find similar results.

EXAMPLE IV

Repeat Examples I and II and III but vary the circumferential rate of revolution of the cylindrical shaft in 0.1 foot/min. increments between 0.1 and 2.0 foot/min. and find similar results.

EXAMPLE V

Repeat Examples I-IV but vary the relative feed velocity in increments of 0.03 inch/revolution of the shaft between 0.06 inch per each revolution of the shaft to 0.30 inch per each 0.1 to 2.0 foot/min. revolution of the shaft and find similar results.

Thus, by the practice of this invention, there is provided a gas-shielded flux cored arc welding process that is particularly suited for repairing high carbon, chromium-molybdenum cylindrical shafts (e.g. AISI Nos. 4130, 4140, and 4340). By controlling the speed of revolution of the shaft and feed of the weld deposit zone an automatic overlay of globular metal transfer is insured.

While the chemical composition of the filler weld metal is matched as closely as possible to that of the high carbon alloy steel shaft, greater emphasis is to be preferably placed on the process application method. Very careful control of preheat, interpass heat, weld wire feed, voltage, amperage and post heat treatment produce a self tempering and stress relieving effect that leaves the deposited weld metal with nearly the same physical properties as those of the shaft base metal.

Laboratory metallurgical examination and physical testing of process samples have verified that the shaft base metal remains nearly unchanged with respect to tensile and yield strengths and hardness. Microscopic examination of deposited weld metal has revealed microstructures similar to those of the shaft base metal. Microhardness testing has indicated only a slight variation of material hardness in both the shaft base metal and the weld deposit. The microstructure of the shaft base metal to that of the two heat effect zones have remained nearly unchanged by the welding process of this invention.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A flux cored arc welding process for depositing a weld metal onto a revolving cylindrical workpiece having a longitudinal axis comprising the steps of:

(a) moving along a longitudinal axis of a revolving cylindrical workpiece, per each 0.1 foot/min. to 2 feet/min. circumferential rate of revolution of the cylindrical workpiece, a weld deposit zone at a relative feed velocity of from about 1/32 inch per each revolution of the cylindrical workpiece to about 2 inches per each revolution of the cylindrical workpiece, wherein the weld deposit zone is depositing a weld metal onto the revolving cylindrical workpiece in a spiral fashion; and (b) wrapping the deposited weld metal with an insulator means for insulating without post weld heat treating the deposited weld metal.

2. The flux cored arc welding process of claim 1 comprising moving the weld deposit zone along the longitudinal axis of the revolving cylindrical workpiece at a relative feed velocity of from about 1/16 inch per each revolution of the cylindrical workpiece to about 5/16 inch per each revolution of the cylindrical workpiece.

3. The flux cored arc welding process of claim 1 comprising moving the weld deposit zone along the longitudinal axis of the revolving cylindrical workpiece at the relative feed velocity per each about 1 foot/min. circumferential rate of revolution of the cylindrical workpiece.

4. The flux cored arc welding process of claim 3 wherein the relative feed velocity is from about 1/16 inch per each revolution of the cylindrical workpiece to about 5/16 inch per each revolution of the cylindrical workpiece.

5. The flux cored arc welding process of claim 1 additionally comprising revolving the cylindrical workpiece while the deposited weld metal remains wrapped with the insulator means.

6. The flux cored arc welding process of claim 1 wherein said cylindrical workpiece comprises a damaged area, and said flux cored arc welding process additionally comprises removing the damaged area to form an undercut having a depth greater than about 0.06 inch.

7. The flux cored arc welding process of claim 1 wherein said cylindrical workpiece comprises a steel alloy having an AISI No. series selected from AISI No. 4100 series and AISI No. 4300 series.

8. A flux cored arc welding process for depositing a weld metal onto a revolving cylindrical workpiece having a longitudinal axis comprising the steps of:

(a) providing a cylindrical workpiece having a longitudinal axis;
(b) revolving the cylindrical workpiece at a circumferential rate of revolution of from about 0.8 foot/min. to about 1.2 foot/min.;
(c) moving a weld deposit zone along the longitudinal axis of the revolving cylindrical workpiece at a relative feed velocity of from about 1/16 inch per each revolution of the revolving cylindrical workpiece to about 5/16 inch per each revolution of the revolving cylindrical workpiece, per each circumferential rate of revolution of from about 0.8 foot/min. to about 1.2 foot/min., wherein the weld deposit zone is a flux cored arc welding deposit zone depositing a weld metal onto the revolving cylindrical workpiece in a spiral fashion; and
(d) wrapping the deposited weld metal with an insulator means for insulating without post weld heat treating the deposited weld metal.

9. The flux cored arc welding process of claim 8 wherein said cylindrical workpiece comprises an AISI No. 4100 series steel alloy.

10. The flux cored arc welding process of claim 8 wherein said cylindrical workpiece comprises an AISI No. 4300 series steel alloy.

11. The flux cored arc welding process of claim 8 wherein said weld deposit zone is a gas shielded flux cored deposit zone.

12. The flux cored arc welding process of claim 8 wherein said cylindrical workpiece comprises at least one shaft accessory means for performing a desired function when the cylindrical workpiece is used in a machinery operation.

13. The flux cored arc welding process of claim 12 wherein said shaft accessory means comprises a plurality of stacked impellers.

14. The flux cored arc welding process of claim 8 wherein said cylindrical workpiece comprises a damaged area, and said flux cored arc welding process additionally comprises removing the damaged area to form an undercut having a depth greater than about 0.06 inch.

15. The flux cored arc welding process of claim 11 wherein said gas shielded flux cored deposit zone comprises an electrode wire means having a diameter of from about 1/32 inch to about ⅛ inch, and said flux cored arc welding process comprises feeding the electrode wire means to said gas shielded flux cored deposit zone at a rate of 180 to 400 inches per minute.

16. The flux cored arc welding process of claim 8 wherein said flux cored arc welding process comprises employing 100 to 120 amps and 24 to 26 volts.

17. The flux cored arc welding process of claim 8 additionally comprising revolving the cylindrical workpiece while the deposited weld metal remains wrapped with the insulator means.

18. A flux cored arc welding process for depositing a weld metal onto a revolving cylindrical workpiece having a longitudinal axis comprising the steps of:
(a) providing a cylindrical workpiece with a circumferential surface, a longitudinal axis and containing an AISI No. 4100 series steel alloy or an AISI No. 4300 series steel alloy, and said cylindrical workpiece having at least one impeller means and comprising a damaged area;
(b) removing the damaged area from the cylindrical workpiece to form an undercut having a depth greater than about 0.06 inch from the circumferential surface;
(c) revolving the cylindrical workpiece at a circumferential rate of revolution of about 0.8 to 1.2 foot/min.;
(d) moving, per each about 0.8 to 1.2 foot/min. circumferential rate of revolution of the cylindrical workpiece, a gas-shielded flux cored deposit zone along the longitudinal axis of the revolving cylindrical workpiece at a relative feed velocity of about 1/16 to 5/16 inch per each revolution of the revolving cylindrical workpiece, wherein said gas-shielded flux cored deposit zone is simultaneously depositing a weld metal in a spiral fashion into the undercut while moving simultaneously along the longitudinal axis of the cylindrical workpiece;
(e) terminating the depositing of the weld metal into the undercut after the undercut has been filled with the weld metal;
(f) surrounding the weld metal-filled undercut with an insulator means without having post weld heat treated the weld metal-filled undercut to insulate the weld metal-filled undercut from ambient atmosphere and to slowly cool the weld metal-filled undercut; and
(g) revolving the cylindrical workpiece while the insulator means surrounds the weld metal-filled undercut.

19. The flux cored arc welding process of claim 18 additionally comprising preheating the undercut of step (b) prior to said moving step (d).

20. The flux cored arc welding process of claim 19 wherein said gas-shielded flux cored deposit zone comprises employing a shielding gas, a current ranging from about 100 to about 120 amps, and a voltage ranging from about 24 to about 26 volts.

21. A welding process for depositing a weld metal onto a revolving cylindrical workpiece having a longitudinal axis comprising the steps of:
(a) moving along a longitudinal axis of a revolving cylindrical workpiece a weld deposit zone to deposit a weld metal onto the revolving cylindrical workpiece in a spiral fashion to form a deposited weld metal; and
(b) wrapping the deposited weld metal with an insulator.

22. The welding process of claim 21 wherein said deposited weld metal is wrapped with said insulator without post weld heat treating the deposited weld metal.

23. The welding process of claim 21 additionally comprising revolving the cylindrical workpiece while the deposited weld metal remains wrapped with the insulator.

24. The welding process of claim 21 wherein said cylindrical workpiece comprises an alloy steel composition having above about 0.30% by weight carbon.

25. The welding process of claim 21 wherein said weld deposit zone is moved at a relative feed velocity of from about 1/32 inch per each revolution of the cylindrical workpiece to about 2 inches per each revolution of the cylindrical workpiece.

26. The welding process of claim 21 wherein said moving step (a) comprises moving along the longitudinal axis of the revolving cylindrical workpiece, per each 0.1 foot/min. to 2 feet/min. circumferential rate of revolution of the cylindrical workpiece, the weld deposit zone at a relative feed velocity of from about 1/32 inch per each revolution of the cylindrical workpiece to about 2 inches per each revolution of the cylindrical workpiece.

27. The welding process of claim 21 wherein said cylindrical workpiece comprises a steel alloy having an AISI No. series selected from AISI No. 4100 series and AISI No. 4300.

28. A flux cored arc welding process for depositing a weld metal onto a revolving cylindrical workpiece having a longitudinal axis comprising the steps of:
   (a) moving along a longitudinal axis of a revolving cylindrical workpiece a weld deposit zone to deposit a weld metal onto the revolving cylindrical workpiece in a spiral fashion to form a deposited weld metal; and
   (b) insulating the deposited weld metal.

29. The flux cored arc welding process of claim 28 wherein said insulating step (b) comprises wrapping the deposited weld metal with an insulator.

30. The flux cored arc welding process of claim 19 wherein said deposited weld metal is wrapped with said insulator without post weld heat treating the deposited weld metal.

31. The flux cored arc welding process of claim 30 additionally comprising revolving the cylindrical workpiece while the deposited weld metal remains wrapped with the insulator.

32. The flux cored arc welding process of claim 28 wherein said cylindrical workpiece comprises an alloy steel composition having above about 0.30% by weight carbon.

33. The flux cored arc welding process of claim 28 wherein said weld deposit zone is moved at a relative feed velocity of from about 1/32 inch per each revolution of the cylindrical workpiece to about 2 inches per each revolution of the cylindrical workpiece.

34. The flux cored arc welding process of claim 28 additionally comprising revolving the cylindrical workpiece.

35. The flux cored arc welding process of claim 28 wherein said moving step (a) comprises moving along the longitudinal axis of the revolving cylindrical workpiece, per each 0.1 foot/min. to 2 feet/min. circumferential rate of revolution of the cylindrical workpiece, the weld deposit zone at a relative feed velocity of from about 1/32 inch per each revolution of the cylindrical workpiece to about 2 inches per each revolution of the cylindrical workpiece.

36. The flux cored arc welding process of claim 28 wherein said cylindrical workpiece comprises a steel alloy having an AISI No. series selected from AISI No. 4100 series and AISI No. 4300 series.

37. The flux cored arc welding process for depositing a weld metal onto a revolving cylindrical workpiece comprising above about 0.30% by weight carbon and having a longitudinal axis comprising the steps of:
   moving along a longitudinal axis of a revolving cylindrical workpiece, per each 0.1 foot/min. to 2 feet/min. circumferential rate of revolution of the cylindrical workpiece, a weld deposit zone at a relative feed velocity of from about 1/32 inch per each revolution of the cylindrical workpiece to about 2 inches per each revolution of the cylindrical workpiece, wherein the cylindrical workpiece comprises above about 0.30% by weight carbon and the weld deposit zone is depositing a weld metal onto the revolving cylindrical workpiece in a spiral fashion to form a deposited weld metal.

38. The flux cored arc welding process of claim 37 additionally comprising insulating the deposited weld metal.

39. The flux cored arc welding process of claim 38 wherein said insulating comprises wrapping the deposited weld metal with an insulator.

40. The flux cored arc welding process of claim 39 wherein said deposited weld metal is wrapped with said insulator without post weld heat treating the deposited weld metal.

41. The flux cored arc welding process of claim 38 additionally comprising revolving the cylindrical workpiece.

42. The flux cored arc welding process of claim 39 additionally comprising revolving the cylindrical workpiece while the deposited weld metal remains wrapped with the insulator.

43. The flux cored arc welding process of claim 38 wherein said deposited weld metal is insulated without post weld heat treating the deposited weld metal.

44. The flux cored arc welding process of claim 37 wherein said cylindrical workpiece additionally comprises chromium-molybdenum.

* * * * *